United States Patent [19]
Tuch

[11] Patent Number: 5,390,165
[45] Date of Patent: Feb. 14, 1995

[54] METHOD AND APPARATUS FOR TRANSMITTING DIGITAL DATA PACKETS ON A WIRELESS CHANNEL

[75] Inventor: Bruce T. Tuch, CE De Bilt, Netherlands

[73] Assignee: NCR Corporation, Dayton, Ohio

[21] Appl. No.: 986,633

[22] Filed: Dec. 4, 1992

[30] Foreign Application Priority Data

Jul. 23, 1992 [GB] United Kingdom ............... 9215619

[51] Int. Cl.⁶ .................. H04B 7/00; H04J 3/14
[52] U.S. Cl. ...................... 370/17; 370/94.1; 340/825.06; 455/69; 455/127
[58] Field of Search ............ 370/13, 13.1, 17, 94.1, 370/95.1, 95.3, 104.1, 84; 455/7, 9, 10, 12.1, 13.4, 68, 69, 127; 340/825.06, 825.5; 379/58, 63

[56] References Cited

U.S. PATENT DOCUMENTS

| | | | |
|---|---|---|---|
| 4,504,946 | 3/1985 | Raychaudhuri | 370/95.3 |
| 4,613,990 | 9/1986 | Halpern | 379/60 |
| 4,783,780 | 11/1988 | Alexis | 370/95.3 |
| 4,811,421 | 3/1989 | Havel et al. | 455/69 |
| 4,816,825 | 3/1989 | Chan et al. | 340/825.06 |
| 4,905,235 | 2/1990 | Saburi | 370/95.3 |

Primary Examiner—Alpus Hsu
Attorney, Agent, or Firm—James M. Stover

[57] ABSTRACT

In a method and apparatus for transmitting digital data packets from a station (12,14) in a wireless communication system, successive time intervals (T) are established and a packet is transmitted only if the transmission thereof does not cause a predetermined average power value ($P_o$) to be exceeded for the current time interval. For each packet an appropriate power value is ascertained from a data base (62), in dependence on the particular destination station to which the packet is to be transmitted. For each time interval (T) a maximum energy value ($I_o$) is decremented in accordance with the energy utilized for transmitting each packet, and a packet is transmitted only if there is sufficient energy remaining to transmit the packet during the current time interval (T).

8 Claims, 5 Drawing Sheets

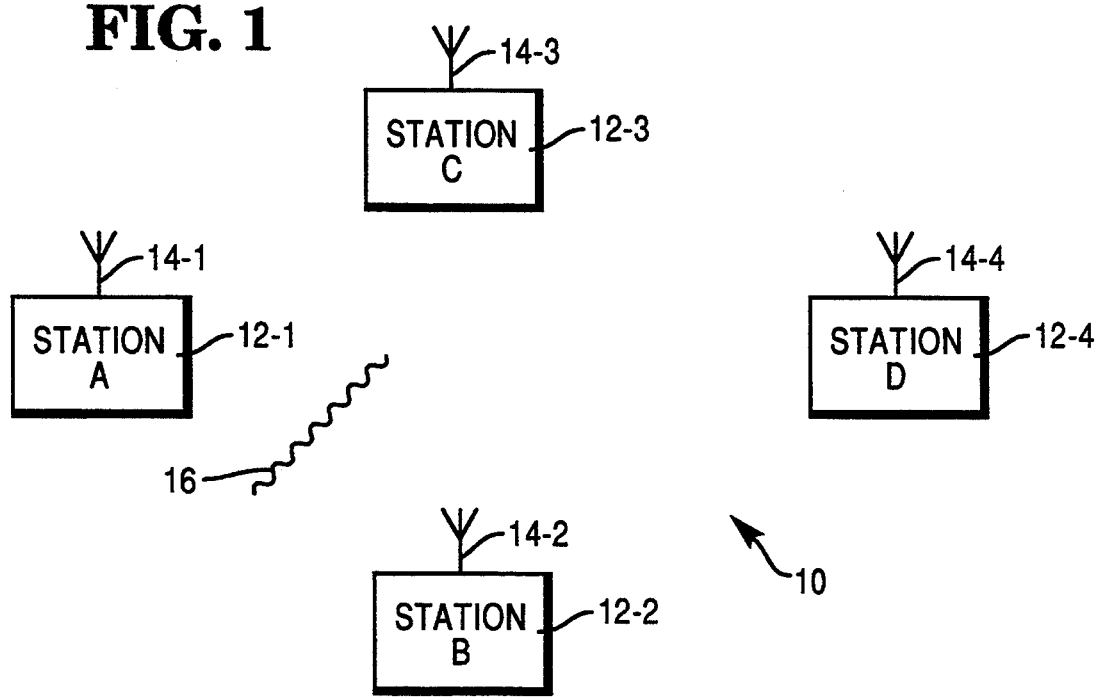
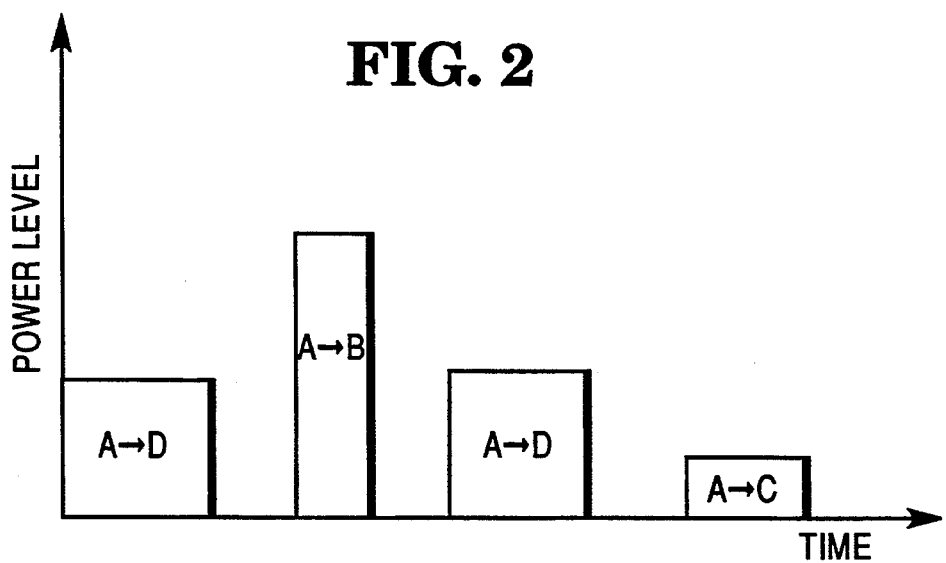

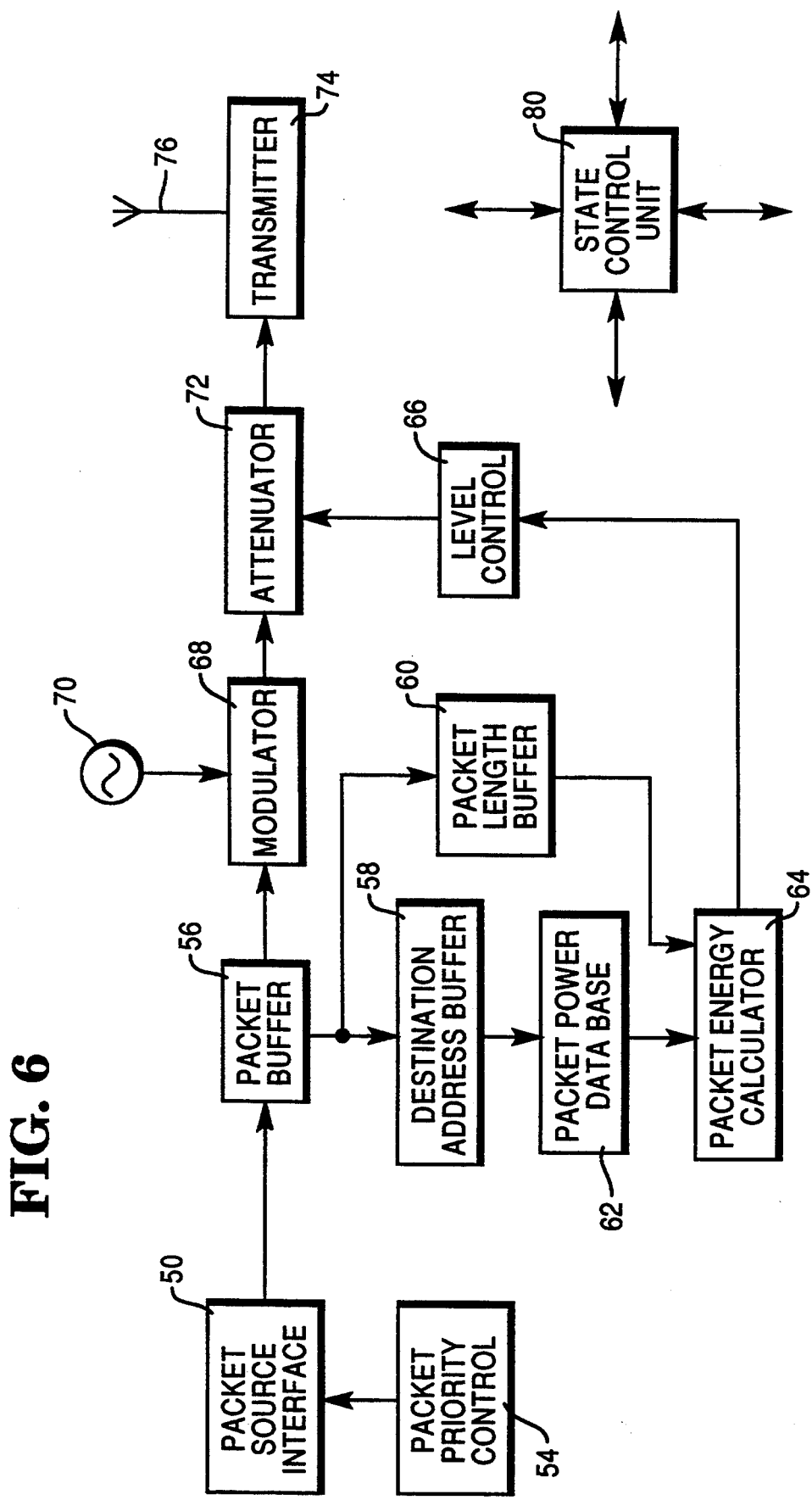

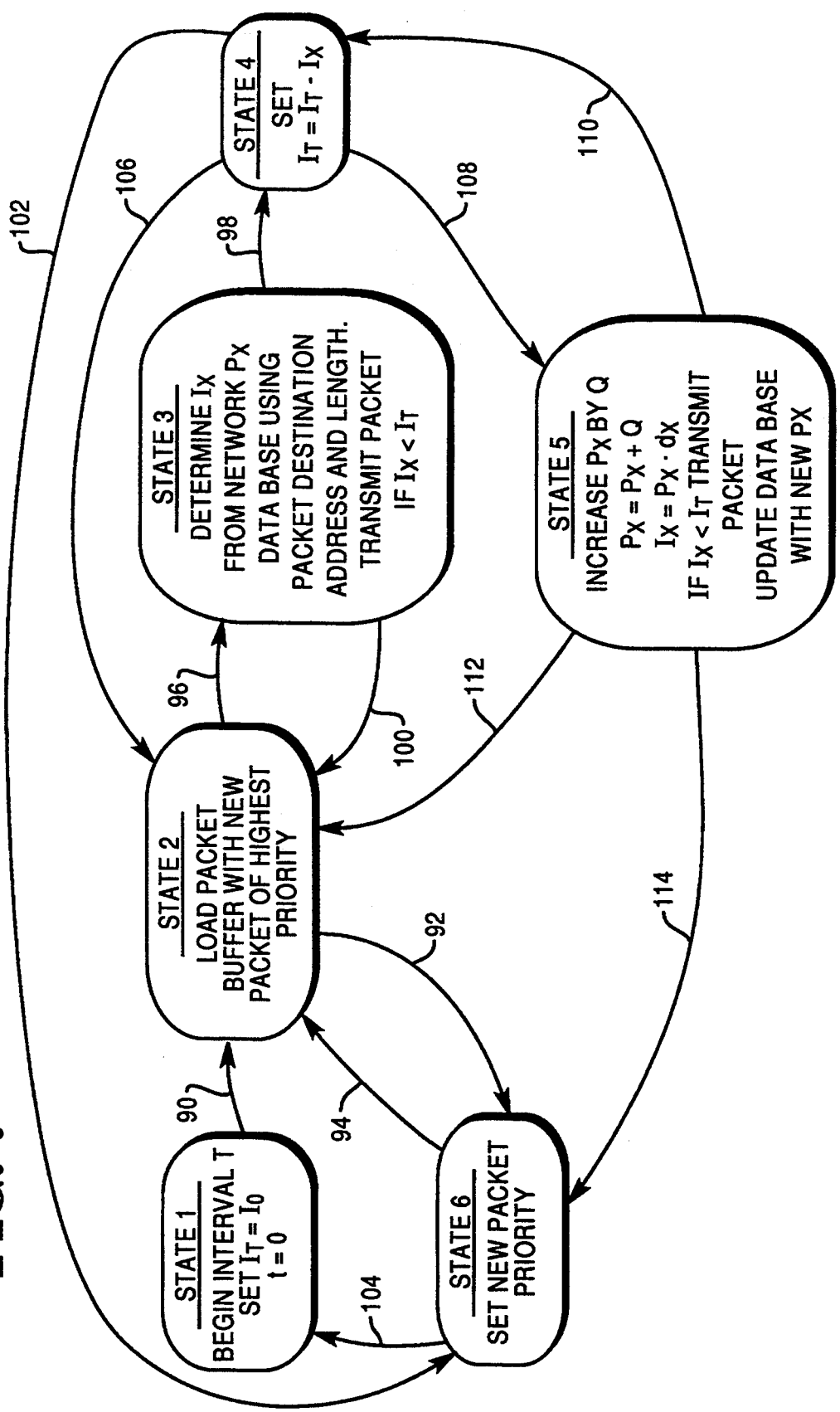

METHOD AND APPARATUS FOR TRANSMITTING DIGITAL DATA PACKETS ON A WIRELESS CHANNEL

This invention is a method of controlling the transmission of digital data packets from a station in a wireless data communication system having a plurality of stations.

The invention also relates to a wireless data communication station adapted to transmit digital data packets in a wireless communication system having a plurality of stations.

BACKGROUND OF THE INVENTION

When transmitting digital information in a wireless communication system there arises a requirement to minimize the interference which may be caused in other systems by such transmissions. In some countries governmental authorities, such as the Federal Communications Commission (FCC) in the United States, have imposed power limit conditions on such wireless communication systems.

U.S. Pat. No. 4,905,235 discloses a time division multiplex wireless transmission system in which a plurality of earth stations communicate with one another via a transponder in a satellite. Transmissions are controlled in accordance with a burst time plan transmitted to and stored in each station such that a predetermined total electric power level is not exceeded at the transponder. This known system relates to satellite communications and is complex and expensive, resulting from the need to transmit and store a burst time plane in all the earth stations in the system.

OBJECT OF THE INVENTION

It is an object of the present invention to provide a method of controlling the transmission of digital data packets from a wireless data communication system having a plurality of stations, which provides a simple and effective control of transmission power levels.

SUMMARY OF THE INVENTION

Therefore, according to one aspect of the present invention, there is provided a method of controlling the transmission of digital data packets from a station in a wireless data communication system having a plurality of stations. The method comprises the steps of: defining successive time intervals; for each packet to be transmitted, determining if a predetermined average power level will be exceeded for the current time interval by the transmission of said packet; and transmitting said packet during said time interval only if said predetermined average power level will not be exceeded.

According to another aspect of the present invention, there is provided a wireless data communication station adapted to transmit digital data packets in a wireless data communication system having a plurality of stations, comprising time interval determining means, adapted to define successive time intervals; control means adapted to determine if a predetermined average power level will be exceeded for the current time interval by the transmission of said packet; and transmission means, adapted to transmit said packet during said time interval only if said predetermined average power level will not be exceeded.

One embodiment of the present invention will now be described by way of example, with reference to the accompanying drawings.

BRIEF DESCRIPTION OF THE DRAWINGS

FIG. 1 is a diagram of a peer-to-peer wireless local area network.

FIG. 2 is a diagram illustrating packet power levels utilized in the network shown in FIG. 1.

FIG. 6 is a block diagram of a portion of station for controlling transmission power levels.

FIG. 7 is a state diagram illustrating the operation of the circuitry shown in FIG. 6.

DETAILED DESCRIPTION OF THE PREFERRED EMBODIMENT

Referring first to FIG. 1, there is shown a peer-to-peer wireless LAN (local area network) 10 including a plurality of stations 12, identified individually as stations 12-1 to 12-4 and referred to as stations A, B, C and D, respectively. The stations have respective antennas 14 referred to individually as antennas 14-1 to 14-4, and transmission between the stations 12 is effected by transmitting information packets directly over a wireless communication channel from a source station to a destination station. Of course, there may be more than four, or less than four stations 12, depending on the implementation.

In order to transmit packets effectively to ensure correct reception at the desired receiving station, different packet power levels are utilized. The respective appropriate power level values are dependent on factors such as interstation distance, signal multipath fading and electro-magnetic absorbing obstacles such as the obstacle 16 shown schematically as a wavy line.

Referring to FIG. 2, the power levels of typical information packets transmitted by station A to stations B, C and D is shown. Thus transmission from station A to station B requires a relatively high power level due to the electromagnetic absorbing obstacle 16, transmission from station A to relatively close station C needs only a relatively low power level, and transmission from station A to station D needs an intermediate power level. In this connection, it will be appreciated that using the minimum power necessary to achieve effective packet reception has the advantage that less interference is generated, on average, than if a fixed power level dimensioned for the "worst case" maximum distance were employed. It will also be appreciated that for stations powered by batteries, battery power savings are achieved.

Figure 3:
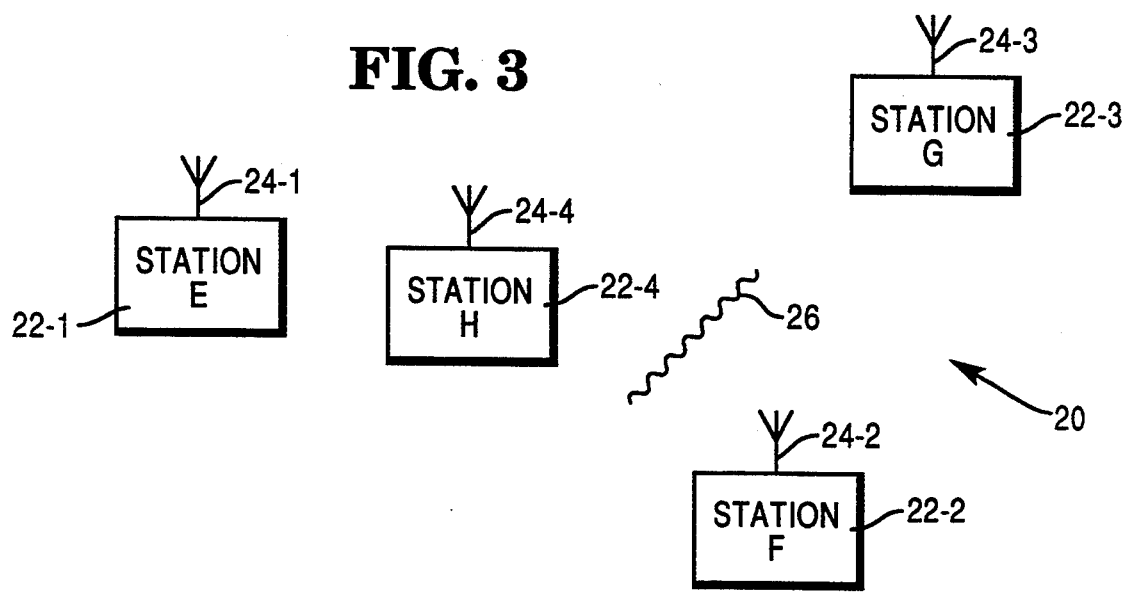
FIG. 3 is a diagram of a central star wireless local area network.
Figure 4A:
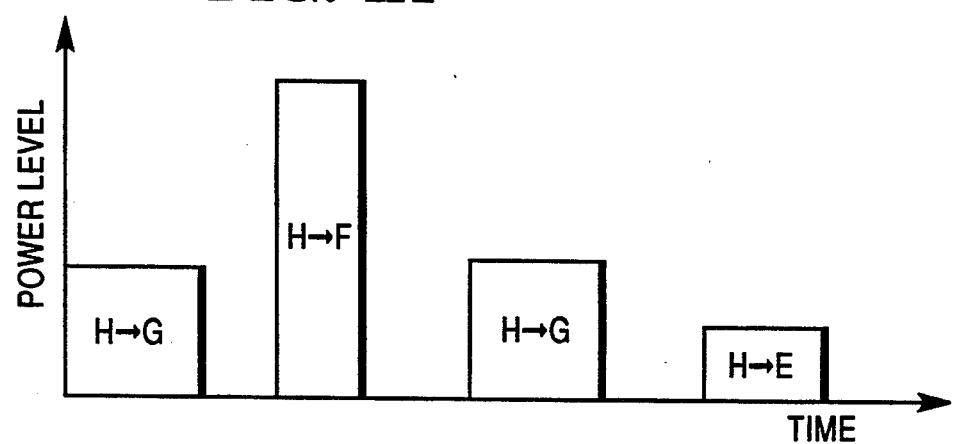
FIG. 4A and 4B are diagrams illustrating packet power levels utilized in the network shown in FIG. 3.
Figure 4B:
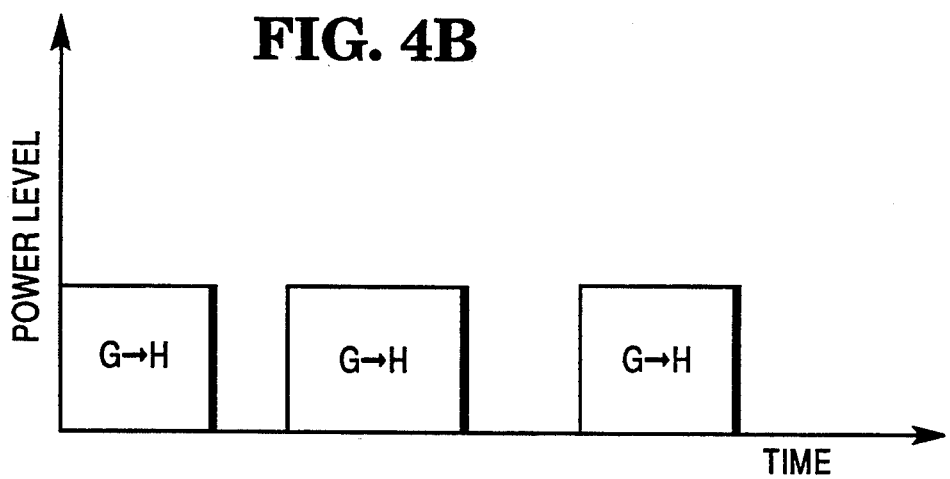

Referring to FIG. 3, there is shown a central star wireless LAN 20 including a plurality of stations 22, identified individually as stations 22-1 to 22-4 and referred to as stations E, F, G and H, respectively. In the LAN 20, all communications are effected via station H, which is referred as the hub station. The stations have respective antennas 24, referred to individually as antennas 24-1 to 24-4. An electromagnetic absorbing obstacle 26 is shown, as in FIG. 1, by a wavy line. The stations E, F and G communicate with one another via the hub station H. As in the peer-to-peer wireless LAN 10 shown in FIG. 1, the hub station H transmits information packets to destination stations E, F and G with power levels dependent on the destination station distance and quality of the transmission path as shown in FIG. 4A. However, since for each station E, F and G there is only one path to the hub station H, each station E, F and G uses individually only one power level, as shown for example for station G in FIG. 4B for transmissions from station G to the hub station H, regardless of which station is the ultimate destination station, although the power level may be different for different stations.

Figure 5:
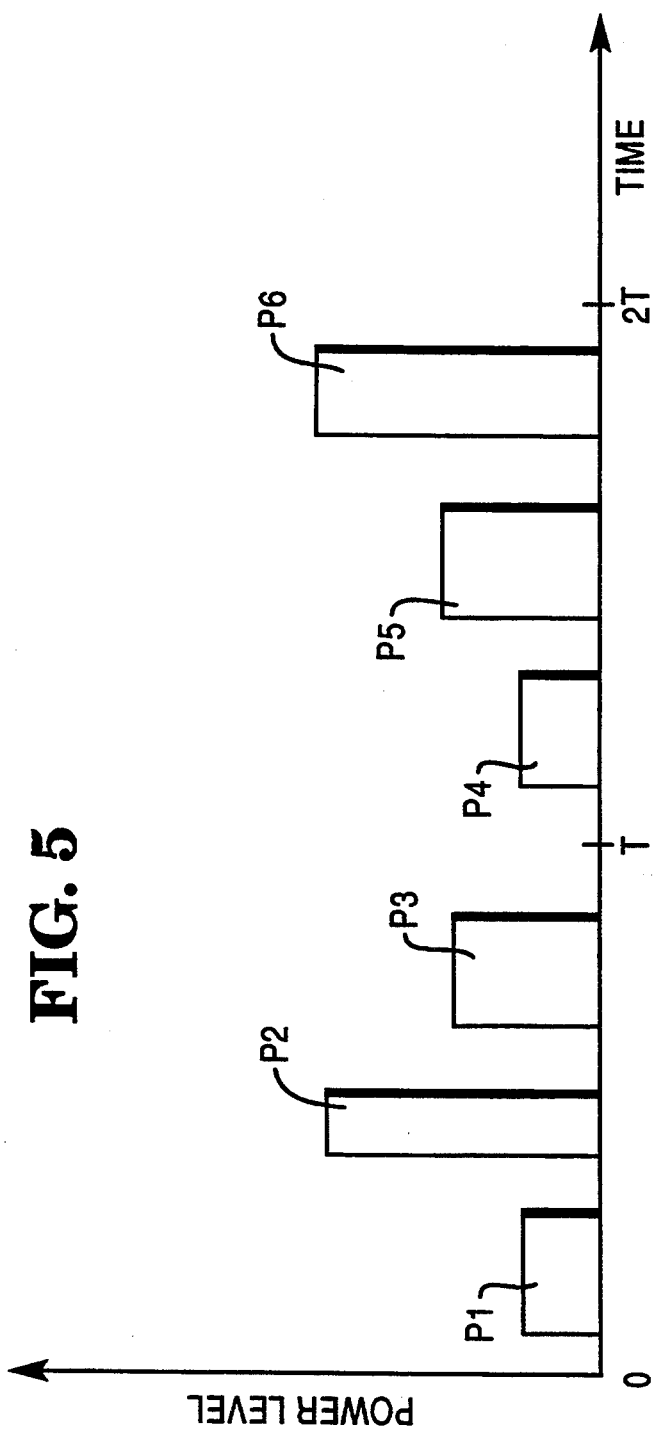
FIG. 5 is a diagram illustrating transmit packet power levels in successive time intervals.

As an aid to understanding the theoretical basis of the present invention, reference will now be made to FIG. 5, which shows a diagram of power levels of packets P1 through P6 transmitted by a typical station in a wireless LAN assumed to be station A in the LAN 10, FIG. 1. With a view to avoiding interference problems in other equipment, it is generally desirable that transmissions from the station should not exceed some predetermined power level, which may be set, for example by government regulatory authorities The present invention makes use of the "busty" nature of packet transmissions, that is, a station uses the wireless transmissions medium sporadically, with significant idle periods between transmitted packets. A fixed average power value $P_o$ is assumed as a basis. A succession of equal length time intervals T, having durations substantially greater than a typical packet duration is established at the station. Two such time intervals T are shown in FIG. 5. Then, $$P_o = I_o/T \tag{1}$$

where $I_o$ is maximum transmitted energy in an interval T which ensures that the power level $P_o$ is not exceeded when averaged over the interval. Let $$I_x = P_x d_x \tag{2}$$

where $P_x$ is the power level at which a typical packet X is transmitted, $d_x$ is the duration of packet X, and $I_x$ is the energy contained in packet X.

Then the following relationship must be satisfied:

$$\sum_{x=1}^{N} I_x \leq I_o \tag{3}$$

where N is the number of packets transmitted during time interval T(N=3 for the exemplary transmission illustrated in FIG. 5). In other words, packet transmissions are controlled in the station, such that the average power level for transmitted packets does not exceed $P_o$, averaged over each interval T. Of course, the power level of an individual packet may possibly exceed $P_o$, provided that average power level over the interval T does not exceed $P_o$ In the preferred embodiment, the time intervals T may have a duration of about 100 milliseconds whereas typical information packets have a duration in the range of from about 1 millisecond to about 3 milliseconds.

Referring now to FIG. 6, there is shown a block diagram of a portion of a station, such as station A in the LAN 10, FIG. 1. A packet source interface 50 stores packets to be transmitted. Each packet has a priority associated therewith, a packet priority control circuit 54 determining which packet is transmitted to a packet buffer 56. The packet buffer 56 is coupled to a destination address buffer 58 and to a packet length buffer 60. The destination address buffer 58 is coupled to a packet power data base 62 which is connected to a packet energy calculator 64, which also receives an input from the packet length buffer 60. The output of the packet energy calculator 64 is coupled to a level control circuit 66.

An output of the packet buffer 56 is connected to a modulator 68, which also receives an input from an oscillator 70. The output of the modulator 68 is connected to an attenuator 72, which is controlled by the level control circuit 66. The output of the attenuator 72 is coupled to a transmitter 74 for transmission over the station antenna 76, such as the antenna 14-1 of station A, FIG. 1. The circuitry shown in FIG. 5 operates under the control of state control unit 80, in a manner which will now be described.

Referring to FIG. 7, there is shown a state machine diagram which represent the operation of the state control unit 80 shown in FIG. 6. As previously mentioned, successive time intervals T are defined. No information from previous transmissions (previous T intervals) is used, and the operation is therefore designated as memory less. State 1 defines the initial point of time interval T by initiating operation of a timer. In this state, the full transmission energy I is available, since no packets have yet been transmitted. Assuming that the station has at least one packet to be transmitted stored in the packet source interface 50, FIG. 6, State 2 is entered via line 90. In State 2, such packet to be transmitted, or the highest priority packet to be transmitted, selected under the control of the packet priority control circuit 54, is sent to the packet buffer 56. Otherwise, the state machine waits until a packet does arrive or the time interval T expires and a new interval begins, as shown by lines 92, 94.

With a new packet stored in the packet buffer 56, the state machine proceeds over line 96 to State 3. In State 3, the power necessary to reach the destination station is determined by storing the destination address in the destination address buffer 58, and accessing the packet power data base 62 which provides the power level $P_x$ needed by the transmitting station for packet X to reach its destination station. The packet energy needed, $I_x$ is calculated in the packet energy calculator 64, utilizing the power level value $P_x$ and the packet length $d_x$ derived from the packet length buffer 60, using equation (2) above. If the packet energy $I_x$ is less than the amount of energy available $I_T$, then the packet is transmitted at the required power level, as determined by the attenuator 72 (FIG. 6) under the control of the level control circuit 66 and State 4 is entered over line 98. If the requisite transmit energy is greater than what remains available for the interval, then State 2 is entered over line 100 and a new packet is loaded into the packet buffer 56. It should be understood that the packet priorities are not changed at this time and that only a new packet, if available, which has not been previously loaded into the packet buffer 56 is now loaded therein.

In State 4 the available energy left in the time interval T is calculated by subtracting the previously transmitted packet energy from the previously available time interval energy. If the time interval T has expired (t=T) then the state machine proceeds over line 102 to State 6 where the station sets new packet priorities and enters State 1 over line 104. It should be noted that all packets are now regarded as new, including packets which could not be transmitted in the previous time interval T.

It will be appreciated that these packets can be assigned a higher priority by the priority control circuit 54.

In State 4, if the time interval T has not expired then the state machine may proceed over line 106 to enter State 2 so that another packet can be loaded into the buffer 56. However, in the preferred embodiment, the transmitting station acquires information regarding the reception success of its transmitted packets. The acquisition of such feedback information is well known to those skilled in the art of data communication. This information is applied to, and temporarily stored in, the state control circuit 80, FIG. 6. With this information available, if it is found that the transmitted packet was not correctly received at its destination station, then the state machine enters State 5, over line 108. In State 5, it is known that the packet power value $P_x$ stored in the data base 62 (FIG. 6) is no longer valid. Therefore, the packet power value is increased by a predetermined incremental value Q. The new packet power value is used to update the data base 6 and to calculate the new packet energy value using equation (2). If this new energy value is less than the energy available for transmission in the remaining portion of the current interval T, then the packet is transmitted and State 1 is entered via line 110. If the time interval T has not expired and there is insufficient energy remaining in the current time interval, then State 2 is entered via line 112 and a new packet can be loaded into the packet buffer 56. Once the time interval expires, t=T, State 6 is entered via line 114 to set new packet priorities and the state machine returns to State 1 to commence operating in the next time interval T.

The state machine diagram of FIG. 7 includes operation where the transmission of a packet may commence towards the end of an interval T and continue into the next interval T, such that the total transmitted energy during this latter interval T could be higher than I. Similarly, the transmitted energy during a period with duration T but offset to the original interval T timing could be higher than Io. However, averaging over N intervals T yields a result which ensures an energy less than $((N+1)/N)*I_o$. In other words, with measurement equipment having an integration time much longer than T, the averaged power level will be less than $I_o/T$. Thus, to ensure that power limit conditions imposed by governmental authorities are met, the value of $I_o$ as used in practice should be slightly lower than the required value, dependent on the measurement integration time.

It will be appreciated that the state control unit 80 is preferably arranged to maintain a count of the number of transmission attempts for each packet, such count being passed to the packet priority control unit 54 for use in determining packet priorities.

Thus there has been disclosed a method and apparatus for controlling the transmission of digital data packets from a station in a wireless communication system which enables transmission power to be maintained at on average low level, without the need to reduce the data transmission rate.

I claim:

1. A method of controlling the transmission of digital data packets from a source station to a destination station in a wireless data communication system having a plurality of stations, comprising the steps of:
   defining successive time intervals (T), said successive time intervals (T) including a current time interval and subsequent time intervals;
   for each packet to be transmitted, determining if a predetermined average power level ($P_o$) will be exceeded for the current time interval by the transmission of said packet; and
   transmitting said packet during said current time interval only if said predetermined average power level ($P_o$) will not be exceeded and deferring the transmission of said packet to a subsequent one of said successive time interval (T) if said predetermined average power level ($P_o$) will be exceeded for said current time interval.

2. The method according to claim 1, wherein:
   for each packet to be transmitted by said source station, a minimum packet power level ($P_x$) is determined which is necessary to transmit said packet to said destination station.

3. The method according to claim 2, wherein each packet to be transmitted has a minimum packet power level ($P_x$) and a duration ($d_x$), said step of determining if said predetermined average power level ($P_o$) will be exceeded includes the steps of:
   calculating a maximum energy value ($I_o$) for said current time interval, dependent on said predetermined average power level ($P_o$);
   for each packet to be transmitted, calculating a packet energy value ($I_x$) dependent on said minimum packet power level ($P_x$) and the duration of said packet ($d_x$);
   comparing said packet energy value ($I_x$) with an available energy value portion ($I_T$) of said maximum energy value ($I_o$); and
   transmitting said packet and updating said energy value portion ($I_T$) by subtracting said packet energy value ($I_x$) therefrom if said packet energy value ($I_x$) is less than said available energy value portion ($I_T$).

4. The method according to claim 3, further comprising the steps of:
   increasing the packet energy value ($I_x$) of said packet by a predetermined amount if said packet transmitted by said station is not correctly received by the destination station of said packet; and
   retransmitting said packet at the increased packet energy value, provided that said predetermined average power level ($P_o$) will not be exceeded as a result of said retransmission.

5. The method according to claim 1, wherein:
   each one of said time intervals (T) has a duration of 100 milliseconds; and
   said digital data packets have durations in the range of from 1 millisecond to 3 milliseconds.

6. A wireless data communication station adapted to transmit a digital data packet from a source station to a destination station in a wireless data communication system having a plurality of stations, said data packet containing destination station information identifying said destination station, comprising:
   power level determining means (58,60,62,64) connected to receive said packet destination information for determining a minimum packet power level ($P_x$) which is necessary to transmit said packet to said destination station;
   attenuation means (72) connected to receive said packet and responsive to said power level determining means to adjust the transmission level of said digital data packet to said determined minimum packet power level ($P_x$);

control means (80) connected to monitor said minimum packet power level ($P_x$) for determining if a predetermined average power level ($P_o$) will be exceeded for a predetermined time interval (T) by the transmission of said packet during said time period; and transmission means (74) connected to said attenuation means and responsive to said control means for transmitting said packet during said predetermined time interval (T) only if said predetermined average power level ($P_o$) will not be exceeded and deferring the transmission of said packet to a subsequent time interval if said predetermined average power level ($P_o$) will be exceeded for said predetermined time interval (T).

7. The wireless data communication station according to claim 6, further comprising:

packet supply means (50, 54) adapted to supply said digital data packet to a buffer storage means (56) in accordance with packet priorities associated with said packet; and said power level determining means (58,60,62,64) and said attenuation means (72) being connected to receive said packet from said buffer storage means.

8. The wireless data communication station according to claim 6, wherein:

said packet to be transmitted has a duration ($d_x$), and said control means:

calculates a maximum energy value ($I_o$) for said time interval, dependent on said predetermined average power level ($P_o$);

calculates a packet energy value ($I_x$) dependent on said minimum packet power level ($P_x$) and the duration of said packet ($d_x$); and compares said packet energy value ($I_x$) with an available energy value portion ($I_T$) of said maximum energy value ($I_o$) to determine if said predetermined average power level ($P_o$) will be exceeded for a predetermined time interval (T) by the transmission of said packet during said time period.

* * * * *